United States Patent [19]
Vogelaar et al.

[11] 3,881,370
[45] May 6, 1975

[54] VARIABLE SPEED BELT DRIVE FOR AN AGRICULTURAL MACHINE

[75] Inventors: Bernard Francis Vogelaar, Moline; Mahlon Lloyd Love, Osco; Charles Edward Cook, Hampton, all of Ill.

[73] Assignee: Deere & Company, Moline, Ill.

[22] Filed: June 29, 1973

[21] Appl. No.: 374,901

[52] U.S. Cl. .................. 74/230.17 F; 74/230.17 D; 74/230.17 M
[51] Int. Cl. .............................................. F16h 55/56
[58] Field of Search ............ 74/230.17 D, 230.17 F, 74/230.17 M; 56/10.2, 11.8

[56] References Cited
UNITED STATES PATENTS

| | | | |
|---|---|---|---|
| 2,235,122 | 3/1941 | Shaw | 74/230.17 D |
| 3,600,960 | 8/1971 | Karig et al. | 74/230.17 F |
| 3,628,390 | 12/1971 | Derlely | 74/230.17 D X |
| 3,653,283 | 4/1972 | Betz | 74/230.17 M X |
| 3,727,476 | 4/1973 | Heidorn | 74/230.17 M X |

FOREIGN PATENTS OR APPLICATIONS

| | | | |
|---|---|---|---|
| 1,256,023 | 2/1964 | Germany | 74/230.17 F |

*Primary Examiner*—Samuel Scott
*Assistant Examiner*—P. S. Lall

[57] ABSTRACT

A self-propelled combine has a pair of forward drive wheels driven through a transmission having its input connected to the engine output shaft by a belt drive that includes an upper, fixed ratio portion and a lower, infinitely variable portion. The output sheave of the fixed ratio drive is an integral part of one of the sheave elements of the variable diameter drive sheave of the variable speed belt drive, said sheaves being mounted on a common shaft carried by a swingable arm on the side of the combine, the diameter of the variable diameter drive sheave being controlled by a hydraulic cylinder within the variable diameter sheave, the shiftable sheave element on said sheave being connected to the opposite element by a spline connection. The driven sheave in the variable speed belt drive is also a variable diameter sheave and includes spring means that operates between the opposite sheave elements to provide the belt tension. A cam also interconnects the opposite sheave elements to cause axial sheave motion and consequent increased belt tension when one sheave element rotates relative to the other due to increased torque transmitted through the driven sheave. The belt tension in the variable speed drive is automatically transmitted to the belt in the fixed ratio drive.

22 Claims, 7 Drawing Figures

VARIABLE SPEED BELT DRIVE FOR AN AGRICULTURAL MACHINE

BACKGROUND OF THE INVENTION

This invention relates to a variable speed belt drive for a harvesting machine or the like, and more particularly to an improved infinitely variable speed belt drive for propelling an agricultural machine, such as a combine or the like.

It is well known to utilize infinitely variable speed belt drives in the propulsion drive for combines or the like, the variable speed belt drives conventionally providing the input to a shiftable transmission, so that the combine has infinitely variable speed characteristics within different speed ranges provided by the transmission. Such belt drives are shown in U.S. Pat. Nos. 3,295,384, issued Jan. 3, 1967 to Love et al., and 2,639,569, issued May 26, 1953 to Pasturczak, both of which are also assigned to the assignee herein.

However, with increasing combine size and the power necessary to drive such combines, a problem has arisen in providing adequate capacity and durability in the drive belts. Previous belt drives have utilized a high range of belt speeds that resulted in high stress at low output speeds and excessive stress due to centrifugal force at high speeds. Also, in said previous drives utilizing two belt drives, there has been a problem in equalizing the belt tension in the two belts. Further, there has been a problem in providing adequate belt tension. While in some highly loaded belt drives spring-loaded idlers have been utilized to automatically provide the proper belt tension, idlers are undesirable in a propulsion drive since the drive must transmit a reverse torque when the engine is used to brake the vehicle. Also, on current drives relatively high tensions are initially required, thereby reducing the belt life.

To overcome the above problems, a combine has recently been introduced with a belt drive having a torque-sensing driven sheave in the variable speed drive to automatically adjust the belt tension in response to the torque transmitted through the drive. Of course, torque-sensitive belt drives, utilizing means for sensing the torque and adjusting the diameter of the driven sheave in response to the torque change are known per se, although generally utilized in lighter duty applications.

SUMMARY OF THE INVENTION

According to the present invention, there is provided an improved torque-sensing variable speed drive. More specifically, an improved torque-sensing variable speed propulsion drive is provided for an agricultural machine, such as a combine or the like.

An important feature of the invention resides in the provision of a two-belt drive, wherein the tension in the belt drive with the torque-sensing means is automatically applied to the other belt drive. Also, there is provided a belt drive wherein proper belt tension is maintained without the use of idlers. Another feature of the invention resides in improved means for initially adjusting the tension of the belt drives. Also, there is provided a dual-belt drive, having a fixed ratio drive and an infinitely variable ratio drive, the drive sheave of one being coaxially mounted with the driven sheave of the other on a swingable shaft, so that the belt tension in the variable ratio drive is automatically transmitted to the belt in the fixed ratio drive. Also, improved means are provided for adjusting the ratio in the variable ratio drive.

An important aspect of the invention resides in the provision of an improved torque-sensing sheave in said variable speed drive. More specifically, there is provided a torque-sensing sheave that senses torque in both directions. Further, an improved design for a torque-sensing sheave is provided wherein the sheave has a compact and rugged construction, with a minimum amount of axial dimension. Still another feature of the torque-sensing sheave resides in improved means for safely disassembling the drive for maintenance of the drive and the sheave.

Another important feature of the drive is in the improved design of the coaxially connected driven sheave of the fixed ratio drive and the drive sheave of the variable ratio drive, said improved design including spline means for drivingly interconnecting the sheave halves of the variable diameter drive sheave, improved hydraulic means for adjusting the effective diameter of the variable diameter sheave, and improved lubrication of the sheaves.

DESCRIPTION OF THE PREFERRED EMBODIMENT

Figure 1:
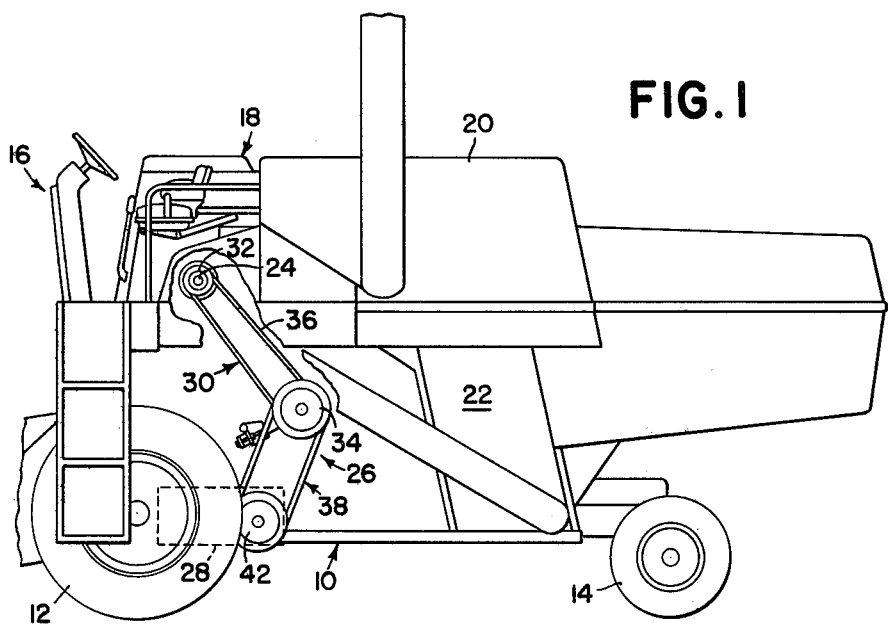
FIG. 1 is a side elevation of a self-propelled combine embodying the improved belt drive with portions of the combine being broken away to more clearly show the invention.

The invention is embodied in a self-propelled combine having a main separator body or frame, indicated generally by the numeral 10, mounted on a pair of forward drive wheels 12 and steerable rear wheels 14. An elevated operator's station 16 is disposed at the front of the machine on the left side alongside an engine enclosure 18 at the right side of the body, and an elevated grain tank 20 spans the width of the combine immediately behind the operator's station 16 and the engine enclosure 18, the opposite sides of the grain tank overhanging opposite sidewalls 22 of the body 10. A transversely oriented internal combustion engine (not shown) is mounted in the engine enclosure 18 and has a transverse engine output shaft 24 that extends to the left side of the combine beneath the seat of the operator's station as described in U.S. Pat. Nos. 3,599,407, issued Aug. 17, 1971 to Bichel, and 3,583,518, issued June 8, 1971 to Bichel et al., both of which are also assigned to the assignee herein. A belt-type propulsion drive system, indicated in its entirety by the numeral 26, is disposed on the left side of the combine and interconnects the engine output shaft 24 to a shiftable, change-speed transmission 28, which is shown in outline only, the transmission being described in greater detail in said U.S. Pat. Nos. 2,639,569 and 3,295,384.

The belt drive system 26 includes an upper or fixed ratio drive 30, that includes a fixed diameter drive sheave 32 on the engine output shaft 24, a fixed diameter driven sheave 34 and a V-belt means, here a pair of side-by-side V-belts 36, trained around the drive and driven sheaves 32 and 34. The fixed ratio drive 30 serves as the input to an infinitely variable ratio drive 38, that includes a variable diameter drive sheave 40 coaxially connected to the driven sheave 34, a variable diameter, torque-sensing driven sheave 42, and a V-belt 44 trained around the drive and driven sheaves 40 and 42, the driven sheave 42 serving as the input for the transmission 28.

Figure 2:
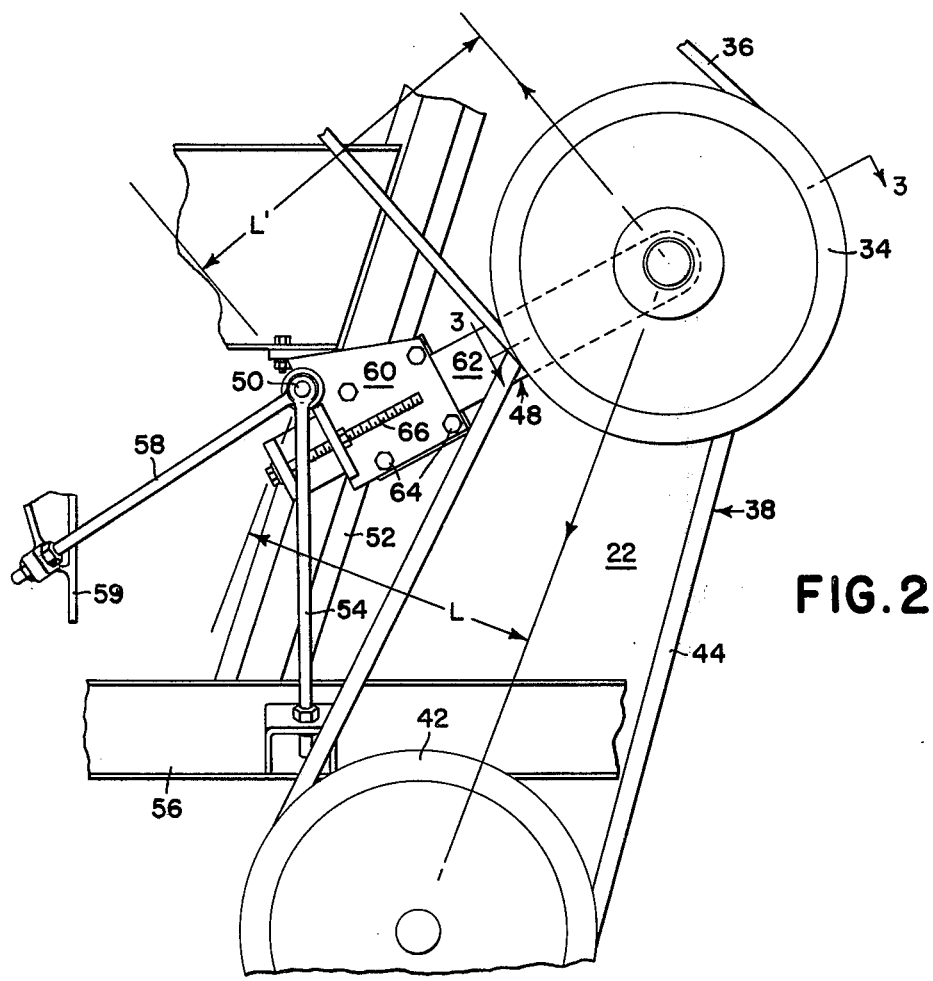
FIG. 2 is an enlarged side elevation view of the lower, variable speed portion of the belt drive.

The driven sheave 34 of the fixed ratio drive and the drive sheave 40 of the variable ratio drive are mounted on a common transverse shaft 46 mounted on an arm 48 that is swingable about a transverse pivot 50 parallel to the axis of the shaft 46, whereby the arm 48 and the shaft 46 mounted thereon swing in a vertical arc along the left side of the combine, so that the belt tension in the lower or infinitely variable ratio drive 38 is automatically transmitted to the upper or fixed ratio drive 30. The inner end of the pivot 50 is mounted on a generally vertical frame element 52 along the combine sidewall 22, and a vertical brace rod 54 supports the outer end of the pivot 50 on a fore-and-aft frame element 56. The outer end of the pivot 50 is also supported by a fore-and-aft inclined brace 58 extending upwardly and rearwardly from another frame element 59, only a portion of which is shown in FIG. 2.

The arm 48 includes a pair of opposite, plate-like bracket members 60 mounted on the pivot 50 and an elongated arm member 62 longitudinally slidable between the bracket members 60. A plurality of fasteners 64 extend between the opposite bracket members 60 and are tightenable to clamp the elongated arm member therebetween, and an adjusting bolt 66 extends between the forward end of the arm member 62 and the outer bracket member 60. As is apparent, when the fasteners 64 are loosened, the adjusting bolt 66 can be turned to shift the arm member longitudinally of the bracket members, thereby changing the distance between the pivot 50 and the axis of the shaft 46. As the axis of the shaft 46 moves away from the axis of the pivot 50, the distance between the drive and driven sheaves 32 and 34 in the fixed ratio drive 30 and the distance between the drive and driven sheaves 40 and 42 in the variable ratio drive 38 both increase, to increase belt tension. As previously stated, the tension in the V-belt 44 is automatically transmitted to the upper pair of belts 36. Since the tension in the lower belts 44 is directed downwardly along the centerline between the two sheaves in said lower belt drive, and the tension in the upper belt drive is directed upwardly and forwardly along the centerline between the two sheaves in the upper belt drive, the opposite belt tensions operate through different moment arms, respectively represented by the letters L and L' in FIG. 2. In the illustrated embodiment, the lever arm L for the lower belt tension is slightly less than the lever arm L' for the upper belt tension, so that the lower belt tension is slightly higher than the upper belt tension, which results in approximately equal tension ratios in both drives, since the upper belt speed is slightly faster than the average lower belt speed.

The driven sheave 34 of the fixed ratio drive 30 includes an annular hub 68 mounted on the outer end of the shaft 46 by a pair of axially spaced bearings 70, the inner bearing seating against a shoulder 71 on the shaft, while the outer bearing is retained on the shaft by a washer 72 secured to the end of the shaft by a nut 74 threaded on the end of the shaft. As is apparent, the bearings 70 are spaced by an abutment 75 on the interior of the hub 68, so that the nut 74 clamps the stacked bearings and the abutment against the shoulder 71 on the shaft. A sheave member 76 is coaxially attached to the outer end of the hub 68 by means of bolts 78 and has a pair of adjacent V-belt grooves 80 on its outer periphery in which the V-belts 36 ride.

Integral with the sheave member 76 is a fixed sheave element 82 of the variable diameter drive sheave 40. The fixed sheave element 82 has a conventional inclined sheave face 84 opposite an inclined sheave face 86 of an adjustable sheave element 87 of the variable diameter sheave 40. The adjustable sheave element 87 includes an outwardly extending sleeve 88 coaxially attached to the rest of the sheave element 87 by means of a plurality of bolts 89. The sleeve 88 has an internal spline 90, which meshes with an external spline 92 on the exterior of the hub 68. The adjustable sheave element 87 is illustrated in its innermost or furthermost position to the left in FIG. 3, wherein the variable diameter sheave 40 has its minimum diameter, the dotted line position of the end of the sleeve 88 representing the furthermost position of the adjustable sheave element 87 to the right, wherein the sheave has its maximum effective diameter.

An annular, sleeve-like piston 94 is mounted for axial shifting on the shaft 46 adjacent the inner end of the shaft, and a bearing 96 on the exterior of the piston 94 rotatably supports the adjustable sheave element 87 on the piston 94. The tension in the belt 44, which engages the opposite sheave faces 84 and 86, exerts an axial thrust on the adjustable sheave element 87 toward the left in FIG. 3, and the thrust load holds the bearing 96 together, the bearing being of the type that accommodates axial loads as well as radial loads, the single bearing replacing the conventional pair of bearings. A snap ring 97, mounted on the piston adjacent the outer end, is engageable by the adjustable sheave element 87 to limit the axial shifting of the adjustable sheave element relative to the piston to hold the bearing parts together in the event that the belt tension is removed, such as when the belt breaks.

The shaft 46 has a larger diameter portion 98 adjacent the inner end of the shaft on which the inner end of the piston 94 is mounted, a seal 100 being provided between the piston and the shaft, while the outer end of the piston, which has a smaller internal diameter, is mounted on a smaller diameter portion 102 of the shaft and sealed thereon by a seal 104. The annular space between the shoulder on the shaft between the larger and smaller diameter portions and the piston defines an annular pressure chamber 106 that communicates with a radial passage 108 in the shaft. An axial passage 110 in the shaft 46 connects the radial passage 108 to a hydraulic line 112. The combine operator controls the flow of pressurized fluid to the pressure chamber 106 and the exhaust of the fluid therefrom by conventional valving to adjust the position of the piston 94 on the shaft and thereby the position of the adjustable sheave element 87, so that the operator selectively controls the effective diameter of the adjustable diameter sheave 40.

A seal 114 is disposed at the inner end of the adjustable sheave element 87 adjacent the bearing 96, and a second seal 116 is disposed at the outer end of the adjustable sheave element sleeve 88 to seal the opposite ends of the adjustable sheave element. A grease passage 118 is provided in the adjustable sheave element 87 and communicates with a chamber 119 between the shaft 46 and the interior of the sleeve 88. Grease from the chamber lubricates the bearing 96, as well as the spline coupling between the hub 68 and the sleeve 88. Lubricant from the chamber also lubricates the two bearings 70, the outer end of the hub 68 being closed by a removable end cap 120. Thus, the interior of the combined sheaves 34 and 40 is provided with lubricant and sealed to lubricate the bearings and the spline connection.

Figure 4:
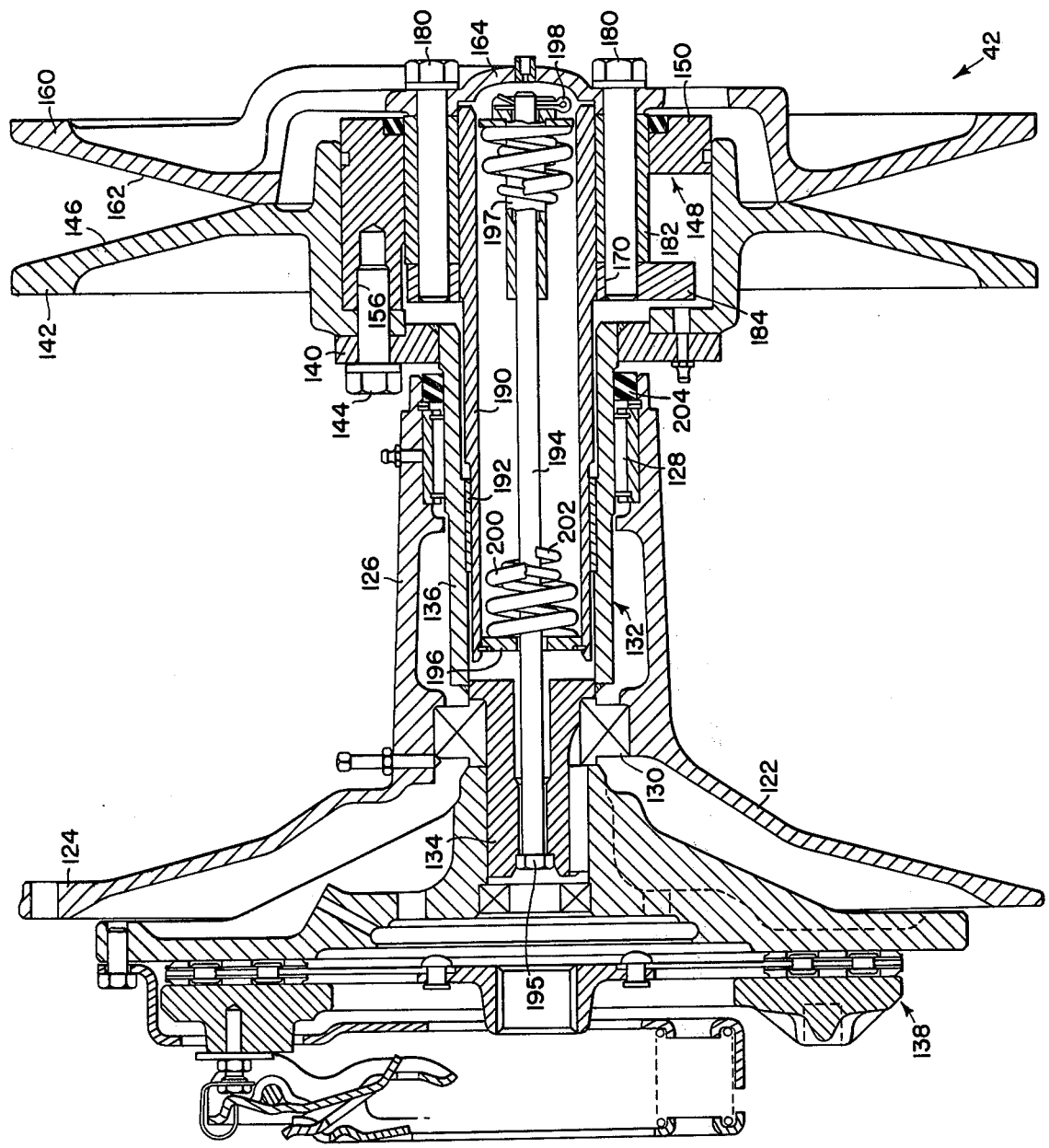
FIG. 4 is an axial section through the torque-sensing variable speed driven sheave.

The torque-sensing sheave 42 is illustrated in FIG. 4 and is rotatably supported on the side of the main separator body or frame 10 by means of a bell-shaped housing 122 having a mounting flange 124, bolted to the side of the housing of the transmission 28 and an outwardly extending neck 126 that is open outwardly. A roller bearing 128 is disposed within the neck adjacent the outer end and a ball bearing 130 is axially spaced from the roller bearing 128 and disposed adjacent the inner end of the neck. A tubular shaft 132 is rotatably supported on the bearings 128 and 130 and includes a smaller diameter inner end 134 within the bearing 130 and a larger diameter sleeve portion 136 supported in the roller bearing 128. The inner end of the shaft 132 is keyed to a main drive clutch 138, which releasably connects the shaft 132 to the transmission input shaft. The clutch 138 is of known construction and will not be described in detail.

Figure 5:
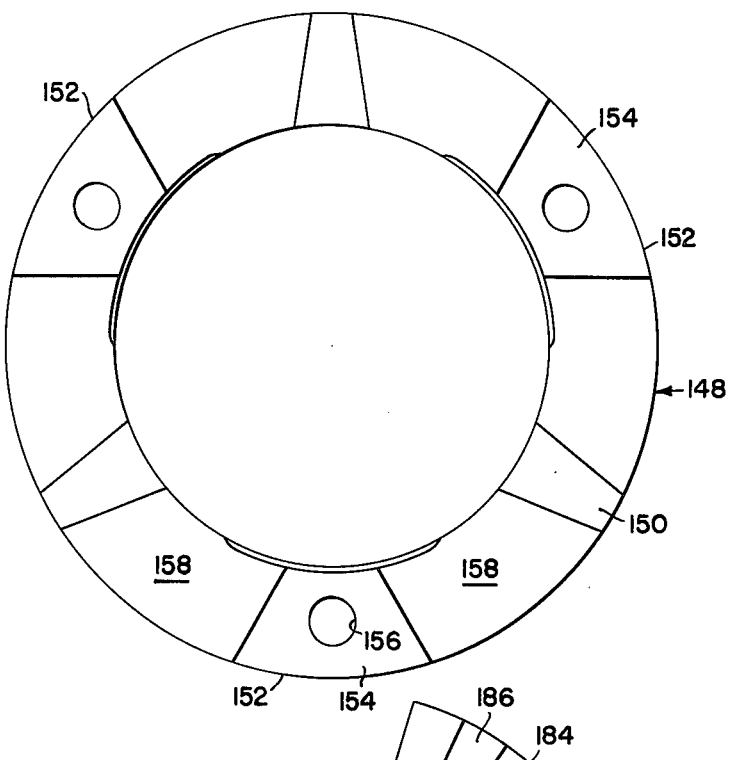
FIG. 5 is an enlarged end view of the outer cam element of the variable speed torque-sensing driven sheave.
Figure 7:
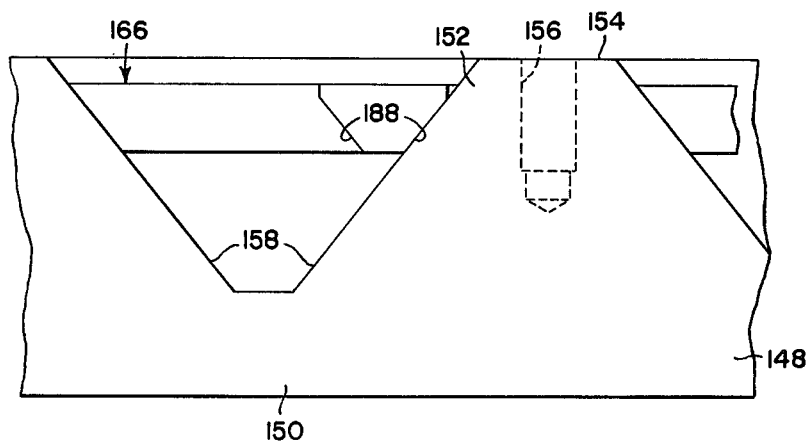
FIG. 7 is a development view of portions of the mating cam elements.

An annular flange 140 is attached to the outer end of the shaft portion 136, and a fixed sheave element 142 of the variable diameter torque-sensing sheave 42 is attached to the flange 140 by means of a plurality of bolts 144. As is conventional, the sheave element 142 has an inclined sheave face 146 engaged by the V-belt 44. An annular, fixed cam member 148 is coaxially disposed within and secured to the fixed sheave element 142 and has an annular base 150 with three truncated triangular cam elements 152 disposed at equiangular intervals adjacent the periphery of the cam base and extending inwardly in an axial direction toward the side of the combine. Each cam element has a flat top which seats against the fixed sheave element 142 and is provided with a threaded bore 156 into which the bolts 144 are threaded to lock the fixed cam member to the fixed sheave element and the shaft 132. Each cam element has similar cam surfaces 158 on its opposite side extending obliquely from the cam element top 154 to the cam member base 150 as shown in FIGS. 5 and 7.

Figure 6:
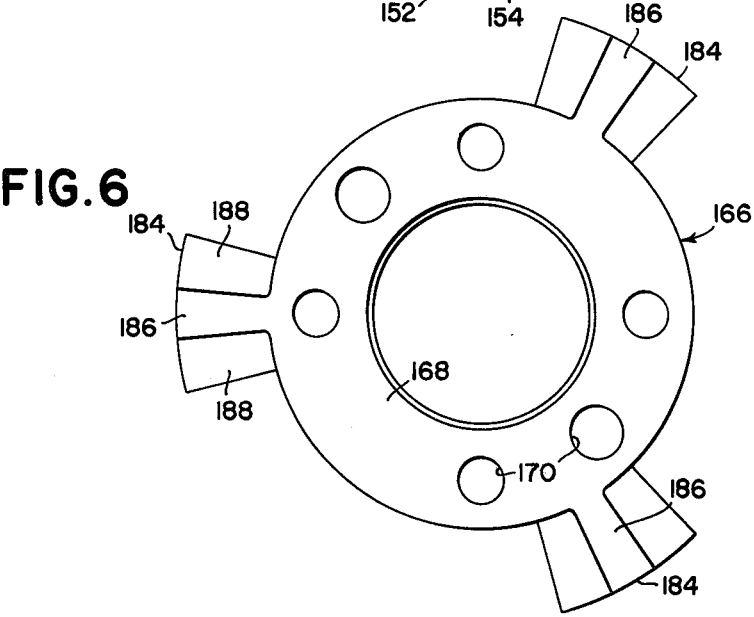
FIG. 6 is an enlarged end view of the inner cam element.

The variable diameter torque-sensing sheave 42 also includes an adjustable sheave element 160 having an inclined sheave face 162 opposite the fixed sheave face 146 and a central hub portion 164. An annular, shiftable cam member 166 is coaxially attached to the hub portion 164 and includes a base portion 168 provided with a plurality of axially extending threaded bores 170. A plurality of bolts 180 extend through the hub portion 164 and through axially extending bores in an annular bushing 182 disposed between the hub portion 164 and the cam member 166, the threaded ends of the bolts 180 being threaded into bores 170 to rigidly attach the cam member 166 to the adjustable sheave element 160. The cam member 166, like the fixed cam member 148, has three truncated triangular cam elements 184 with flat top surfaces 186 and inclined cam surfaces 188 on opposite sides of each cam element 184, the shiftable cam member being shown in FIG. 6. As best seen in FIG. 7, the cam surfaces 188 on the shiftable cam member have the same inclination as the cam surface 158 on the fixed cam member and cause the adjustable cam member to shift axially in response to relative rotation between the two cam members. Since the fixed cam member is attached to the fixed sheave element, and the adjustable cam member is attached to the adjustable sheave element, relative rotation between the two sheave elements will cause axial shifting of one sheave element relative to the other to vary the diameter of the sheave. When the two sheave elements are positioned in their maximum diameter position, as illustrated in FIG. 4, the shiftable cam member 166 is disposed adjacent the cam element tops 154 of the fixed cam member 148, the cam members being illustrated in substantially the maximum diameter condition of the sheave in FIG. 7. As is apparent, the provision of cam surfaces on both sides of the cam elements provide for axial adjustment of the sheave elements in response to relative rotation of the sheave elements in either direction.

A sleeve 190 has its outer end attached to the inner side of the bushing 182 and its inner end is disposed within the sleeve portion 136 of the shaft 132. The sleeve 190 is rotatably supported within the shaft 132 by means of a bearing 192, and the bushing 182 is journaled in the annular fixed cam member 148 to accommodate the rotation of the adjustable sheave element 160 relative to the fixed sheave element 142.

An elongated axially extending threaded rod 194 is coaxially disposed within the shaft 132 and the sleeve 190 and has a head 195 at its inner end that engages the end of the shaft 132. An inner spring retainer 196 is connected to the inner end of the sleeve 190 and an outer spring retainer 197, in the form of an extended nut, is threaded on the threaded outer end of the rod 194, the outer retainer being axially adjustable by rotating the retainer and locked in the desired position by a cotter pin 198 extending through the rod and the retainer. A relatively stiff outer compression spring 200 and a smaller inner compression spring 202 coaxially mounted within the outer spring 200 both extend between the retainer 196 and the retainer 197. As is apparent, the springs bias the sleeve 190 inwardly (to the left in FIG. 4) urging the shiftable sheave element 160 toward the fixed element 142.

The ball bearing 130 is a sealed ball bearing, and a seal 204 is provided on the exterior side of the roller bearing 128, to seal the lubricant within the housing neck 126.

Figure 3:
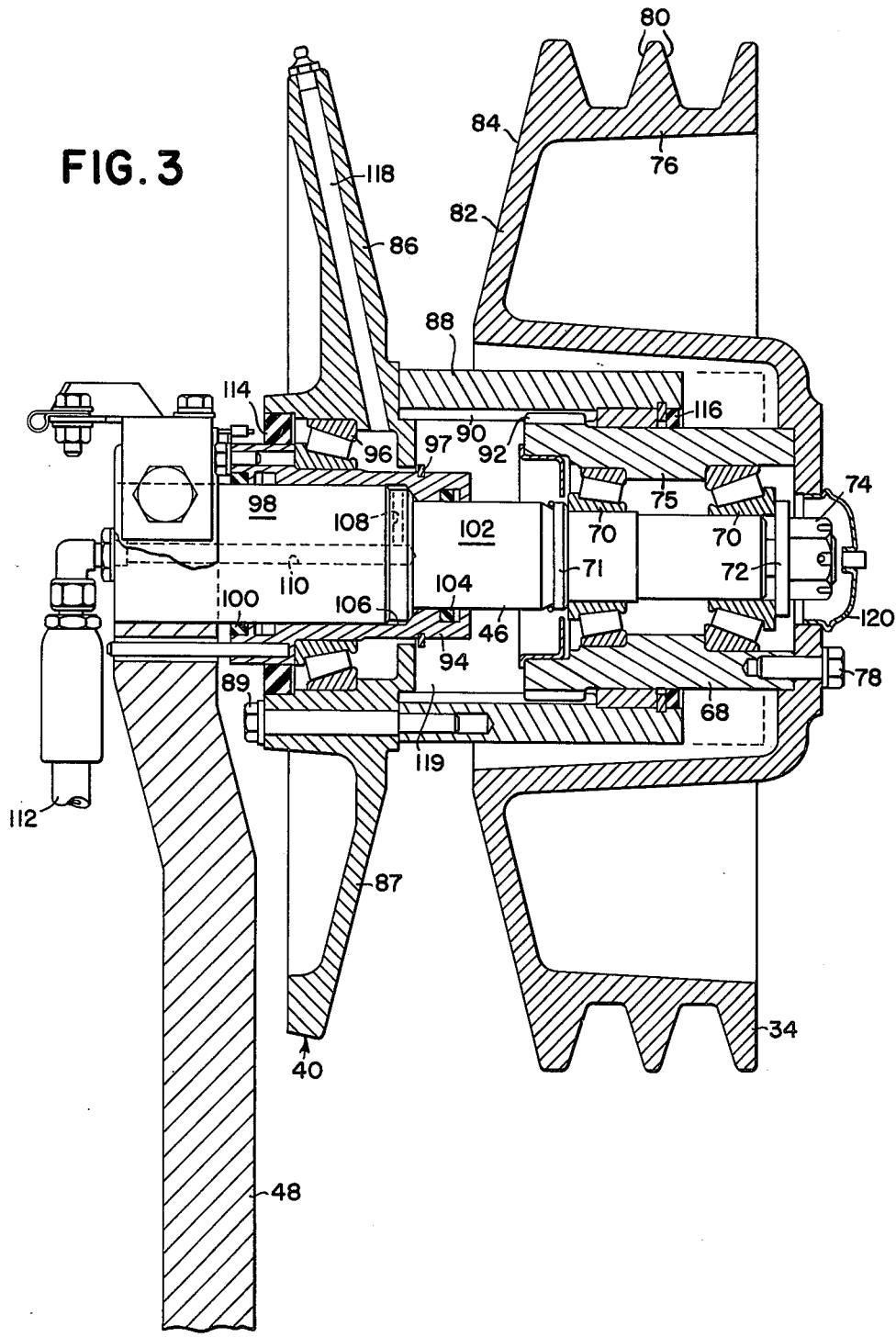
FIG. 3 is an enlarged axial section through the variable speed drive sheave as viewed along the line 3—3 of FIG. 2.

In operation, the engine is operated at a constant speed to drive the drive sheave 32 in the fixed ratio drive 30 at a constant speed. The belt speed of the lower belt 44 of the variable ratio drive 38, of course, varies according to the diameter of the drive sheave 40, the belt speed being at its minimum when the sheave 40 is in its minimum diameter position, as illustrated in FIG. 3, and at its maximum when the sheave is in its maximum diameter position. As an illustration of the belt speeds involved, in current machines now being marketed, wherein the drive sheave of the lower belt drive is a fixed diameter sheave, the upper belt is driven at 5,240 feet per minute, while the lower belt varies between 3,313 feet per minute and 8,286 feet per minute. In the present drive, utilizing the same upper belt speed, wherein the driven sheave 42 of the lower belt drive is of variable diameter, the belt speed varies between 4,360 and 6,890 feet per minute at the minimum and maximum diameters of the drive sheave 40 for substantially the same range of input speeds to the transmission as the previous drive. Since the minimum belt speed in the present system is 4,360 feet per minute as compared to the 3,313 feet-per-minute speed in the previous drive system at the minimum input speed to the transmission, belt capacity at low range is substantially increased. Also, the lesser maximum belt speed in the present system creates considerably less stress due to centrifugal force at maximum speed.

Tension in the lower belt 44 is provided by the springs 200 and 202, which urge the sheave element 160 of the variable diameter torque-sensing sheave 42 toward the opposite element 142. Since the arm 48 is freely swingable, the tension in the lower belt 44 is automatically transmitted to the upper pair of belts 36, the above tension in both belts being supplied without the use of spring-loaded idlers or the like. Of course, the tension is supplied by the springs regardless of the direction of torque transmission, so that the belts are properly tensioned during a torque reversal such as when the engine is being used to brake the combine.

Initial belt tension is provided by adjusting the preload on the springs 200 and 202 via the adjustable outer retainer 197. Preferably, a relatively low initial belt tension is provided to decrease the stress in the belts and increase belt life. Also, the length of the arm is adjusted so that when the variable diameter sheave 40 is in its maximum open or smallest diameter position, as shown in FIG. 3, there is a 0.2 inch gap between the opposite sheave elements 142 and 160 of the torque-sensing sheave 142, the opposite sheave elements being shown abutting one another in FIG. 4. In the illustrated embodiment, the 0.2 inch gap allows approximately 0.63 inch of belt stretch in both the upper and lower belts before the opposite sheave elements in the torque-sensing sheave abut one another to terminate the torque sensing at the lowest drive ratio.

As torque is transmitted through the torque-sensing sheave, the inner or fixed sheave element 142 stays fixed with the output shaft 132. However, the adjustable sheave element 160 is free to rotate relative to the fixed sheave element, and as the torque increases, the tendency of the outer or adjustable sheave element to rotate relative to the fixed sheave element increases. This force is translated into an axial force tending to move the adjustable sheave element toward the fixed sheave element through the cam action between the cam members 148 and 166, the squeezing force supplementing the force applied by the springs 200 and 202 to thereby increase the belt tension. The increased belt tension, of course, is automatically transmitted to the upper pair of belts 36. Thus, the belt tension automatically increases as the torque transmitted through the drive system increases, and conversely automatically decreases as the torque requirement decreases. The automatic adjustment of the belt tension in response to the torque requirement, of course, permits the use of high belt tensions only when such high tensions are needed, thereby increasing the overall belt life. Also, the belts stretch as the force transmitted through the belts increases, and it has been previously impossible to get enough initial belt tension to accommodate the belt stretch during the transmission of large amounts of power through the drive system where spring-loaded idlers are not used. As is apparent, the present system accommodates the belt stretch and provides adequate belt tension without the use of spring-loaded idlers. As the torque increases, the resulting shift of the adjustable sheave element toward the fixed element, of course, increases the diameter of the torque-sensing sheave, to slightly decrease the output speed.

The lower belt 44 can be easily removed to change the belt for service without unloading the tension on the springs 200 and 202, by simply removing the bolts 180, thereby facilitating changing of the belts and avoiding a safety hazard that would be present if the sheave element 160 were spring loaded. The removal of the sheave element 160, of course, removes all but the precompression of the spring, and the extended spring retainer 196 is of sufficient length that the spring precompression is removed before the retainer is unthreaded from the rod 194, also facilitating service of the torque-sensing sheave and avoiding any safety hazards.

The arrangement of the cam members within the torque-sensing sheave allows a lesser overall axial length of the torque-sensing sheave, and in the present case, the sheave is mounted relatively close to the side of the combine, avoiding any interference with the left front drive wheel of the combine. Even though the torque-sensing sheave has a relatively short axial length, there is still provided a good bearing split between the bearings 128 and 130 to accommodate the relatively high loads transmitted through the drive shaft.

As is apparent, both the drive sheave 40 and the driven sheave 42 in the drive system are compact, utilize relatively few parts, and are well lubricated with relatively few seals. An example of the economy of construction resides in the use of the piston 94 as the support for the bearing 96, the replacement of the usual drive pin connections between the sheave elements 82 and 87 with the spline connection, the use of only a single bearing 96 for the adjustable sheave element 87.

We claim:

1. In a harvesting machine having a mobile main frame mounted on drive wheels, a power source having an output shaft and transmission means drivingly connected to the drive wheels, the combination therewith of improved belt drive means drivingly connecting the output shaft to the transmission and comprising: a shiftable shaft; means mounting the shiftable shaft on the main frame for shifting movement transverse to the shaft axis; a fixed ratio belt drive including a fixed diameter drive sheave operatively connected to and driven by the output shaft, a fixed diameter driven sheave mounted on the shiftable shaft, and a first drive belt drivingly trained around said drive and driven sheaves; and a variable ratio belt drive including a variable diameter drive sheave mounted on the shiftable shaft adjacent the fixed diameter driven sheave and driven thereby, control means operatively associated with said drive sheave for controlling the sheave diameter, a variable diameter torque-sensing driven sheave having a fixed sheave element and shiftable sheave element axially shiftable and rotatable relative to the fixed element, a spring means biasing the shiftable sheave element toward the fixed element and toward a maximum diameter condition, cam means operatively connected to the opposite sheave elements to shift the shiftable sheave element toward the fixed sheave element in response to relative rotation between the sheave elements as a result of torque transmitted therethrough above a predetermined value, and a second drive belt trained around the variable diameter drive and driven sheaves, the spring bias on the torque-sensing driven sheave causing a tension in the second drive belt that is transmitted to the first drive belt through the fixed diameter driven sheave, and the shifting of the sheave elements of the torque-sensing sheave as a result of increasing torque causing increased belt tension in both belts.

2. The invention defined in claim 1 wherein the means mounting the shiftable shaft on the main frame includes an arm pivotally mounted on the main frame for swinging about a horizontal axis parallel to the shaft axis.

3. The invention defined in claim 1 wherein the variable diameter drive sheave includes an axially shiftable sheave element and the control means includes hydraulic motor means operatively connected to the shiftable sheave element for shifting said element and changing the effective diameter of the sheave.

4. The invention defined in claim 3 wherein the hydraulic motor means includes an annular piston coaxially mounted and slidable on the shaft, and including bearing means coaxially mounted on the periphery of the piston and coaxially and rotatably supporting the shiftable drive sheave element.

5. The invention defined in claim 1 wherein the torque-sensing sheave elements have opposite belt-engaging faces and the cam means includes first and second cam members respectively coaxially mounted with and connected to the fixed and the shiftable torque-sensing sheave elements and disposed radially inwardly of the sheave faces within the sheave elements.

6. The invention defined in claim 5 wherein the cam members are annular and include a plurality of meshing cam elements with cam surfaces extending obliquely to the axis of the cam members and engageable with the cam surfaces on the opposite cam member to cause axial shifting of the second member during relative rotation of the members in either direction.

7. The invention defined in claim 5 and including a support housing mounted on the main frame, the torque-sensing sheave including a shaft journaled in and extending outwardly from the housing, the fixed sheave element of said sheave being coaxially connected to said shaft adjacent the housing and interposed between the shiftable sheave element and the housing.

8. The invention defined in claim 7 wherein the torque-sensing sheave shaft includes a tubular outer portion and the spring means includes a helical compression spring at least partly coaxially disposed within said tubular portion, and means connecting one end of the spring to said shaft and the other end to the shiftable sheave element.

9. The invention defined in claim 8 wherein the cam members are annular and the means connecting the spring to the shiftable sheave element includes a tubular sleeve at least partly coaxially disposed in the tubular portion of said shaft and within the annular cam members.

10. The invention defined in claim 8 wherein the means connecting the spring to the shaft includes an axially extending rod, having one end connected to the shaft and thread means on its opposite end, and a threaded spring retainer connected to the spring and threadable on the rod to vary the spring compression.

11. In a harvesting machine having a mobile main frame mounted on drive wheels, a power source having an output shaft and transmission means drivingly connected to the drive wheels, the combination therewith of improved belt drive means drivingly connecting the output shaft to the transmission and comprising: a shiftable shaft; means mounting the shiftable shaft on the main frame for shifting movement transverse to the shaft axis; a fixed ratio belt drive including a fixed diameter drive sheave operatively connected to and driven by the power source output shaft, a fixed diameter driven sheave mounted on the shiftable shaft, and a first drive belt drivingly trained around said drive and driven sheaves; and a variable ratio belt drive including a variable diameter drive sheave mounted on the shiftable shaft adjacent the fixed diameter driven sheave and driven thereby and including an axially fixed sheave element having a sheave face, an axially shiftable sheave element having a sheave face opposite the fixed sheave face, hydraulic motor means operatively connected to the shiftable sheave element for shifting said element and changing the effective diameter of the sheave, a variable diameter driven sheave connected to the transmission and having an axially fixed sheave element with a first sheave face, an axially shiftable sheave element having a second sheave face opposite the first sheave face and shiftable to vary the effective diameter of the sheave, and spring means biasing the shiftable sheave element toward the fixed element to bias the sheave towards its maximum diameter condition, and a second drive belt drivingly trained around said variable diameter drive and driven sheaves.

12. The invention defined in claim 11 wherein the hydraulic motor means includes an annular piston coaxially mounted and slidable on the shaft, and including bearing means coaxially mounted on the periphery of the piston and coaxially and rotatably supporting the shiftable drive sheave element.

13. The invention defined in claim 11 wherein the opposite sheave elements of the variable diameter driven sheave are mounted for relative rotation, and including cam means operative between the opposite sheave elements to shift the shiftable sheave element toward the fixed sheave element in response to relative rotation between the sheave elements as a result of increased torque transmitted therethrough above a preterdetermined value, the spring bias on said driven sheave causing a tension in the second drive belt that is automatically transmitted to the first drive belt through the shiftable shaft, the shifting of the sheave element in the variable diameter driven sheave as a result of the torque increase causing increased belt tension in both belts.

14. An improved belt drive comprising: an input shaft; a fixed diameter drive sheave mounted on the input shaft; a shiftable shaft parallel to the input shaft and shiftable toward and away from the input shaft; a fixed diameter driven sheave mounted on the shiftable shaft; a first drive belt means drivingly trained around the fixed diameter drive and driven sheaves; an output shaft parallel to the input shaft and the shiftable shaft; a variable diameter drive sheave coaxially mounted on the shiftable shaft with the fixed diameter driven sheave and operatively connected to and driven thereby, and including control means operatively associated therewith for controlling the sheave diameter; a variable diameter torque-sensing driven sheave mounted on the output shaft and having a fixed sheave element connected to said shaft and a shiftable sheave element axially shiftable and rotatable relative to the fixed element, a spring means biasing the shiftable sheave element toward the fixed element and toward a maximum diameter condition, cam means operatively connected to the opposite sheave elements to shift the shiftable sheave element toward the fixed sheave element in response to relative rotation between the sheave elements in response to increasing torque transmitted therethrough, and a second drive belt trained around the variable diameter drive and driven sheaves, the spring bias on the torque-sensing driven sheave causing a tension in the second drive belt that is transmitted to the first drive belt through the sheaves mounted on the shiftable shaft.

15. The invention defined in claim 14 wherein the control means includes an annular, hydraulically actuated piston coaxially mounted and slidable on the shiftable shaft and including bearing means coaxially mounted on the periphery of the piston and coaxially and rotatably supporting the shiftable drive sheave element.

16. The invention defined in claim 14 and including spline means operatively interconnecting the axially shiftable and the axially fixed sheave elements of the variable diameter drive sheave to permit axial shifting of the shiftable element while causing rotation of the elements in unison.

17. The invention defined in claim 14 wherein the shiftable sheave element of the variable diameter drive sheave is mounted on on a single bearing operative to accommodate both axial and radial loads on the shiftable sheave element caused by the tension in the second drive belt.

18. A variable ratio belt drive comprising: a variable diameter drive sheave including an axially fixed sheave element, an axially shiftable sheave element, and hydraulic control means operatively associated with the shiftable sheave element for controlling the axial position thereof and consequently the effective diameter of the drive sheave; a variable diameter torque-sensing driven sheave having a fixed sheave element, a shiftable sheave element axially shiftable and rotatable relative to the fixed element, a spring means operative to bias the shiftable sheave element toward the fixed element and toward a maximum diameter condition, said sheave elements having opposite inclined sheave faces, a first annular cam member coaxially connected to the fixed sheave element radially inwardly of the sheave element face, a second annular cam member coaxially connected to the shiftable sheave element radially inwardly of the sheave element face, said cam members being disposed within and in substantial vertical alignment with the sheave elements and having meshing cam elements with cam surfaces extending obliquely to the axis of the cam members and engageable with the cam surfaces on the opposite cam member to cause axial shifting of the shiftable element during relative rotation of the members, and spring means operatively biasing the shiftable driven sheave element toward the fixed driven sheave element; and a driven belt trained around the variable diameter drive sheaves, the spring means causing a tension in the drive belt and the mating cam members causing the shiftable driven sheave element to shift toward the fixed element as a result of relative rotation between the elements due to increasing torque transmitted therethrough to increase the effective diameter of the driven sheave and increase the belt tension.

19. The invention defined in claim 18 wherein the spring means includes a helical compression spring at least partially coaxially disposed within the annular cam members and including means connecting one end of the spring to the fixed sheave element and means connecting the other end of the spring to the shiftable sheave element.

20. The invention defined in claim 19 wherein the driven sheave includes a tubular shaft connected to the fixed sheave element and the means connecting the spring to the fixed sheave element includes a rod having a threaded portion and a spring retainer connected to the spring and threadably mounted on the threaded portion, the spring retainer being threadable on the rod to adjust the preload on the spring and consequently the biasing force exerted thereby, the means connecting the opposite end of the spring to the shiftable sheave element including a tubular sleeve around at least a portion of said rod and at least partially disposed within said shaft.

21. An infinitely variable speed belt drive comprising: a first shaft; a variable diameter drive sheave coaxially mounted on said shaft and including an axially fixed sheave element having an inclined sheave face, an axially shiftable sheave element having an inclined sheave face opposite the fixed element sheave face, spline means coaxially connecting the shiftable sheave element to the fixed sheave element for rotation of the elements in unison while accommodating axial shifting of the shiftable sheave element, and control means operatively associated with the shiftable sheave element for controlling the position of said element; a variable diameter torque-sensing driven sheave including an axially fixed sheave element having an inclined sheave face, an axially shiftable sheave element having an inclined sheave face opposite the fixed sheave element face and mounted for rotation relative to the fixed sheave element, spring means operative between the two sheave elements for biasing the shiftable sheave element toward the fixed sheave element, and cam means operative between the opposite sheave elements for shifting the shiftable sheave element toward and away from the fixed sheave element in response to rotation of the shiftable sheave element in opposite directions relative to the fixed sheave element; and drive belt means trained around the drive and driven sheaves, increasing torque transmitted through the driven sheave element causing the shiftable sheave element to rotate relative to the fixed sheave element so that the cam means causes the shiftable sheave element to move toward the fixed sheave element to increase the driven sheave diameter and increase the tension in said belt.

22. The invention defined in claim 21 wherein the control means includes an annular piston mounted on the shaft and forming an annular pressure chamber between the piston and the shaft, the piston being shiftable in response to the flow of pressurized fluid to and from the chamber, and including bearing means rotatably mounting the shiftable drive sheave element on the piston for rotation of the sheave element thereon.

* * * * *

UNITED STATES PATENT OFFICE
CERTIFICATE OF CORRECTION

Patent No. 3,881,370            Dated 6 May 1975

Inventor(s) Bernard Francis Vogelaar, Mahlon Lloyd Love, Charles Edward Cook

It is certified that error appears in the above-identified patent and that said Letters Patent are hereby corrected as shown below:

Column 9, line 5, after "element," insert --the torque sensing sheave and the drive sheave of the fixed ratio belt drive being axially parallel and on opposite sides of the variable diameter drive sheave,--.

Column 10, line 45, after "sheaves" delete --.-- and insert --the spring means creating a belt tension in the second drive belt that is automatically transmitted to the first drive belt through the shiftable shaft.--.

Column 11, line 44, after "mounted" delete --on--.

Column 12, line 7, change "driven" (second occurence) to --drive--.

Column 12, line 8, after "drive" insert --and driven--.

Signed and Sealed this tenth Day of February 1976

[SEAL]

Attest:

RUTH C. MASON
Attesting Officer

C. MARSHALL DANN
Commissioner of Patents and Trademarks